Feb. 15, 1944.  C. W. BAKER  2,341,684
APPARATUS FOR LACING MOCCASIN COLLARS
Filed Dec. 15, 1941

INVENTOR
Corwin W. Baker
By his attorney

Patented Feb. 15, 1944

2,341,684

UNITED STATES PATENT OFFICE 2,341,684

APPARATUS FOR LACING MOCCASIN COLLARS

Corwin W. Baker, Stoneham, Mass., assignor to United Shoe Machinery Corporation, Flemington, N. J., a corporation of New Jersey Application December 15, 1941, Serial No. 422,937

7 Claims. (Cl. 223—50)

This application relates to the manufacture of moccasins and more particularly to that step in the manufacture in which a lace, usually of leather, is threaded through the eyelets of the moccasin collar.

An object of this invention is to provide apparatus by which the lacing of a moccasin collar can be effected rapidly with a minimum of effort on the part of the operator.

In accordance with the above, the eyelets of a moccasin collar are threaded onto a retaining member which, in the illustrated form of the invention, is in the form of a tube. The end of a lace to be threaded through the collar of the moccasin is then temporarily secured to the end of the retaining member, after which the collar is pulled from the retaining member onto the lace, thereby threading the lace through the collar. One feature of the invention resides in the means by which the end of the lace is temporarily secured to the end of the retaining member or tube in such a manner that there is no danger of the lace being accidentally and prematurely pulled away therefrom, whereas the securing means does not in any way injure the end of the lace.

These and other features of the invention will now be described in the following detailed description of the invention and illustrated in the drawing, in which, Fig. 1 is a side elevation partly in section of one form of apparatus in which the invention may be embodied;

Figure 1:
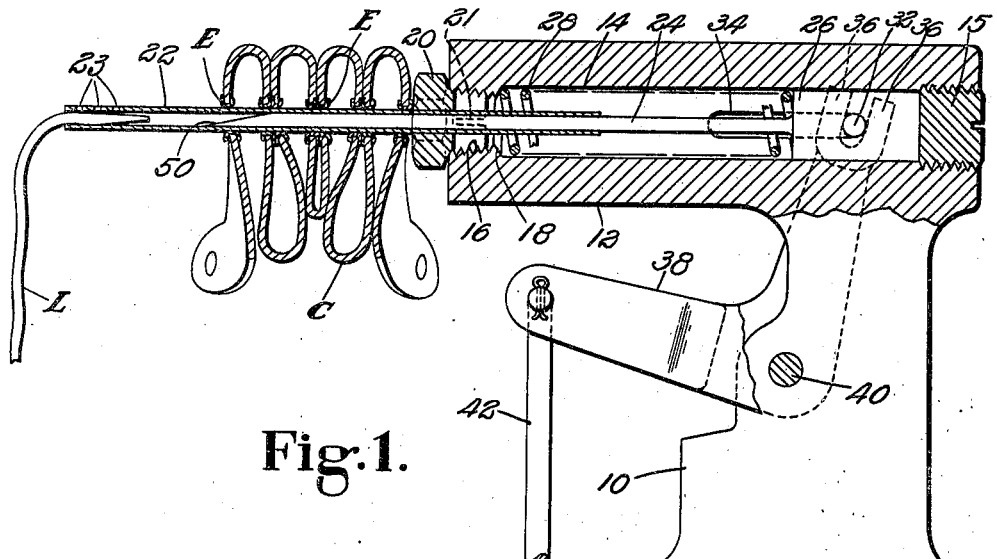

As illustrated in Fig. 1, the apparatus comprises a base 10 having a head 12 provided with a longitudinal bore 14. One end of the bore is closed by a plug 15 and the other end of the bore is threaded at 16. This threaded portion is of smaller diameter than the rest of the bore to form a shoulder 18. The threaded portion 16 is tapered to receive the correspondingly threaded portion of a fitting 20. This fitting is provided with a slot 21 to exert a clamping action on a tube 22 extending therethrough and projecting outwardly from the head 12. This clamping action results from the contraction of the slotted inner end of the fitting 20 as it is screwed into the tapered opening. The outer end of the tube 22 is provided with a plurality of apertures 23 for a purpose to be described.

Slidable within the sleeve is a rod or plunger 24 having an enlarged cylindrical inner end 26 arranged for sliding movement within the bore 14. A spring 28 acts between the enlarged portion 26 of the plunger and the shouldered portion 18 of the bore to maintain the plunger in a retracted position, as illustrated in Fig. 1, with the enlarged portion 26 held against the plug 15. Pins 32 project outwardly from the portion 26 of the plunger through slots 34 in the head and provide means by which the plunger may be moved against the action of the spring. These pins are embraced by the forked ends 36 of a forked lever 38 pivoted at 40 to the base 10. The other end of the lever is connected by a link 42 to a treadle 44 pivoted at 46 to a bracket 48 which may be secured to the floor. Depression of the treadle causes movement of the plunger 24 to the left, as illustrated in Fig. 21, against the force of the spring 28.

Figures 2, 3:
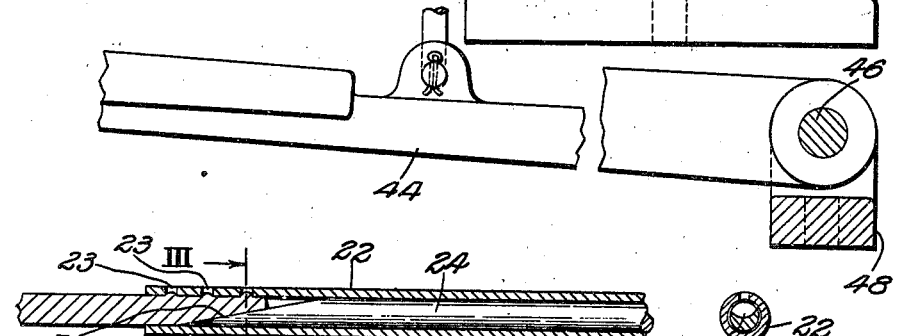
Fig. 2 is a vertical longitudinal section illustrating the means by which the end of the lace is gripped.
Fig. 3 is a section on the line III—III of Fig. 2.

The outer end of the plunger 24 is tapered at 50 and this tapered portion may be crescent-shaped in cross section, as illustrated in Fig. 3. The tapered end of the plunger is arranged upon movement of the plunger from the position shown in Fig. 1 to the position of Fig. 2 to engage the under surface of the end of a previously inserted lace, which end may be tapered as illustrated, and force the lace upwardly against the apertured portion of the tube 22. Thus the lace is wedged between the end of the plunger and the tube, and the material of which the lace is formed may be forced slightly into the apertures 23 as shown in Fig. 2, more firmly to grip the lace to minimize any danger of its being prematurely withdrawn from the tube. The wedging action of the tapered end of the plunger is enhanced by its crescent-shaped cross section, the concave portion of which affords a greater surface engageable with the lace than would be available if the surface were flat.

Figure 4:
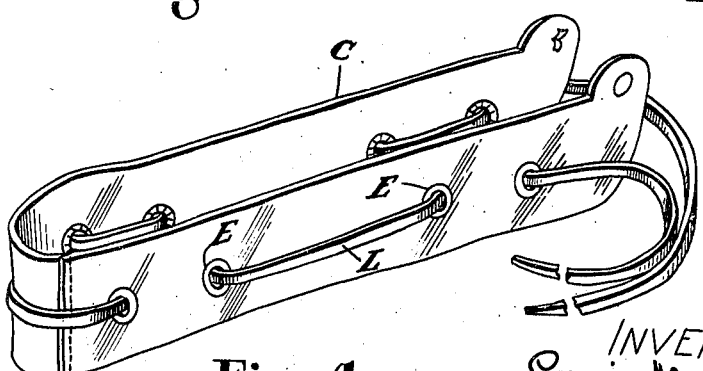
Fig. 4 is a view of a moccasin collar after it has been completely laced.

In the use of this apparatus, a collar C having a plurality of eyelets E, through which a lace is to be inserted, is threaded over the tube 22, as shown in Fig. 1. After the collar has thus been threaded on the tube, the end of a lace L which may be tapered is inserted a slight distance into the end of the tube 22. The treadle is now depressed, thus urging the plunger 24 to the left to the position shown in Fig. 2, thereby wedging the end of the lace against the adjacent wall of the tube and forcing the leather slightly into the apertures 23 positively to grip the lace. With the end of the lace thus clamped in the end of the tube, the moccasin collar is pulled from the tube and over the lace so that the lace is completely threaded through the eyelets of the moccasin collar. After this has been done the treadle 44 is released to cause retraction of the plunger so that the end of the lace, which is now completely threaded through the moccasin collar may be withdrawn from the end of the tube. The completely laced moccasin collar then appears as illustrated in Fig. 4.

This apparatus thus eliminates the necessity of threading the lace manually through each eyelet of the collar and greatly reduces the time necessary for this operation.

Having thus described the invention, what I claim as new and desire to secure by Letters Patent of the United States is:

1. In an apparatus for lacing moccasin collars, a tube over which the eyelets of a moccasin collar may be threaded, said tube having an open unobstructed end arranged to receive the end of a lace, and a plunger slidable within said tube, said plunger having a tapered end portion arranged to clamp a lace inserted into the open end of said tube between said end portion and the opposite inside wall of the tube, the tip end of said tapered portion being in engagement with the interior wall of said tube.

2. In an apparatus for lacing moccasin collars, a tube over which the eyelets of a moccasin collar may be threaded, said tube having an open unobstructed end arranged to receive the end of a lace, and a plunger slidable within said tube, said plunger having a tapered end portion of crescent shape in cross section arranged to clamp a lace inserted into the open end of said tube between said end portion and the opposite inside wall of the tube.

3. In an apparatus for lacing moccasin collars, a tube over which the eyelets of the moccasin collar may be threaded, said tube having an open unobstructed end arranged to receive the end of a lace, the wall of said tube having an aperture adjacent to the end of the tube, and means within the tube for pressing the end of a lace inserted into the open end of said tube against the apertured portion of the wall.

4. In an apparatus for lacing moccasin collars, a tube over which the eyelets of a moccasin collar may be threaded, said tube having an open unobstructed end arranged to receive the end of a lace, the wall of said tube having an aperture adjacent to the end of the tube, and a plunger slidable within said tube, said plunger having a tapered end portion arranged to clamp a lace inserted into the open end of said tube between said tapered end portion and the apertured portion of the wall of said tube.

5. In an apparatus for lacing moccasin collars, a tube over which the eyelets of a moccasin collar may be threaded, said tube having an open unobstructed end arranged to receive the end of a lace, the wall of said tube having a plurality of apertures adjacent to the end of the tube, and a plunger slidable within said tube, said plunger having a tapered end portion of crescent-shaped cross section located within said tube and arranged to clamp a lace inserted into the end of said tube between said tapered end portion and the apertured portion of the wall of said tube.

6. In an apparatus for lacing moccasin collars, a support, a tube projecting from said support and adapted to have the eyelets of a moccasin collar threaded thereover, said tube having an open unobstructed end arranged to receive the end of a lace, a plunger slidable within said tube, said plunger having a tapered end portion arranged to clamp the end of a lace inserted into the end of said tube against the inner wall of the tube, the tip end of said tapered portion being in engagement with the interior wall of said tube, means for moving said plunger toward the end of said tube into clamping relation with the end of a lace, and means for retracting said plunger to release the lace.

7. In an apparatus for lacing moccasin collars, a support, an open-ended tube projecting from said support and adapted to have the eyelets of a moccasin collar threaded thereover, a plunger slidable within said tube, said plunger having a tapered end of crescent shape in cross section arranged to clamp the end of a lace inserted into the end of said tube against the inner wall of the tube, said wall having a plurality of apertures opposite to the tapered portion of said plunger when the plunger is in clamping position, means for moving said plunger toward the end of the tube into clamping relation with the end of a lace inserted in the tube, and means for retracting said plunger to release the lace.

CORWIN W. BAKER.